US008555856B2

(12) United States Patent
Shimamura et al.

(10) Patent No.: US 8,555,856 B2
(45) Date of Patent: Oct. 15, 2013

(54) ENGINE SPEED CONTROL APPARATUS FOR OUTBOARD MOTOR

(75) Inventors: Hideaki Shimamura, Wako (JP); Yoshio Ohtomo, Wako (JP); Mitsuaki Kubota, Wako (JP); Takeshi Inaba, Wako (JP); Hikaru Ikeda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 730 days.

(21) Appl. No.: 12/840,638

(22) Filed: Jul. 21, 2010

(65) Prior Publication Data

US 2011/0036327 A1 Feb. 17, 2011

(30) Foreign Application Priority Data

Aug. 11, 2009 (JP) ................................ 2009-186430

(51) Int. Cl.

*B63H 20/00* (2006.01)
*F02D 41/14* (2006.01)
*B60W 10/04* (2006.01)

(52) U.S. Cl.

USPC ............................................ 123/349; 440/87

(58) Field of Classification Search

USPC ........... 123/349, 350, 352, 399, 403; 440/84, 440/87

See application file for complete search history.

(56) References Cited

U.S. PATENT DOCUMENTS

| | | | | |
|---|---|---|---|---|
| 4,569,425 | A * | 2/1986 | Kenny et al. | 123/339.19 |
| 7,000,592 | B2 * | 2/2006 | Katsuragawa et al. | 123/396 |
| 7,238,071 | B2 | 7/2007 | Takada et al. | |
| 7,249,986 | B2 * | 7/2007 | Otobe et al. | 440/87 |
| 7,306,499 | B2 | 12/2007 | Okuyama | |

FOREIGN PATENT DOCUMENTS

| | | | |
|---|---|---|---|
| JP | 10-053195 | A | 2/1998 |
| JP | 2005-335449 | A | 12/2005 |
| JP | 2006-021557 | A | 1/2006 |
| JP | 2006-029090 | A | 2/2006 |
| JP | 2008-213818 | A | 9/2008 |

* cited by examiner

*Primary Examiner* — Hieu T Vo

(74) *Attorney, Agent, or Firm* — Carrier Blackman & Associates, P.C.; Joseph P. Carrier; William D. Blackman

(57) ABSTRACT

In an apparatus for controlling a speed of an internal combustion engine installed in an outboard motor and having an actuator connected to a throttle valve of the engine to open and close the throttle valve, and up/down command signal outputting devices that output an up/down command signal to increase/decrease the engine speed when manipulated by an operator, the engine speed is controlled to change in response to the up or down command signal with an engine speed change amount per unit time made different depending on whether the detected engine speed exceeds a reference speed or not, thereby enabling to finely and precisely control the engine speed in the low speed range, while facilitating speed regulation.

14 Claims, 6 Drawing Sheets

ENGINE SPEED CONTROL APPARATUS FOR OUTBOARD MOTOR

BACKGROUND OF THE INVENTION

1. Field of the Invention

This invention relates to an engine speed control apparatus for an outboard motor, particularly to an apparatus for controlling a speed of an internal combustion engine of an outboard motor by opening/closing a throttle valve by an actuator.

2. Description of the Related Art

Conventionally, there is proposed an engine speed control apparatus having an actuator connected to a throttle valve of an internal combustion engine installed in an outboard motor and a throttle lever installed on a boat. Based on a manipulation amount of the throttle lever, the apparatus controls the operation of the actuator to open/close the throttle valve, thereby controlling the engine speed.

In recent years, a configuration is given in which, in addition to the above-mentioned throttle lever, a switch is provided on the boat and based on an output of the switch, the operation of the actuator is controlled, so that the operator can easily regulate the engine speed only by manipulating the switch, as taught, for example, by Japanese Laid-Open Patent Application No. 2005-335449 (paragraphs 0030, 0031, 0051, FIGS. 2(B), 10(A), etc.).

SUMMARY OF THE INVENTION

However, in the reference, when the engine speed is regulated through manipulation of the switch, since a change amount of the engine speed is a fixed value, fine control of the engine speed can not be achieved in the low speed range which requires precise speed regulation. It is disadvantageous.

An object of this invention is therefore to overcome the foregoing drawback by providing an apparatus for controlling an engine speed of an outboard motor, which apparatus can finely and precisely control the engine speed in the low speed range, while facilitating speed regulation.

In order to achieve the object, this invention provides in its first aspect an apparatus for controlling a speed of an internal combustion engine installed in an outboard motor adapted to be mounted on a stern of a boat, comprising: an actuator connected to a throttle valve of the engine to open and close the throttle valve; an engine speed controller that controls the engine speed by controlling operation of the actuator; an up command signal outputting device that outputs an up command signal to increase the engine speed when manipulated by an operator; a down command signal outputting device that outputs a down command signal to decrease the engine speed when manipulated by the operator; and an engine speed detector that detects the engine speed, wherein the engine speed controller controls the engine speed to change in response to the up command signal and the down command signal with a change amount of the engine speed per unit time that is made different when the detected engine speed is at or below a reference speed and when the detected engine speed is above the reference speed.

In order to achieve the object, this invention provides in its second aspect a method of controlling a speed of an internal combustion engine installed in an outboard motor adapted to be mounted on a stern of a boat, having an actuator connected to a throttle valve of the engine to open and close the throttle valve, and an engine speed controller that controls the engine speed by controlling operation of the actuator; comprising the steps of: outputting an up command signal to increase the engine speed when manipulated by an operator; outputting a down command signal to decrease the engine speed when manipulated by the operator; and detecting the engine speed, and controlling the engine speed to change in response to the up command signal and the down command signal with a change amount of the engine speed per unit time that is made different when the detected engine speed is at or below a reference speed and when the detected engine speed is above the reference speed.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A preferred embodiment of an engine speed control apparatus for an outboard motor according to the invention will now be explained with reference to the attached drawings.

Figure 1:
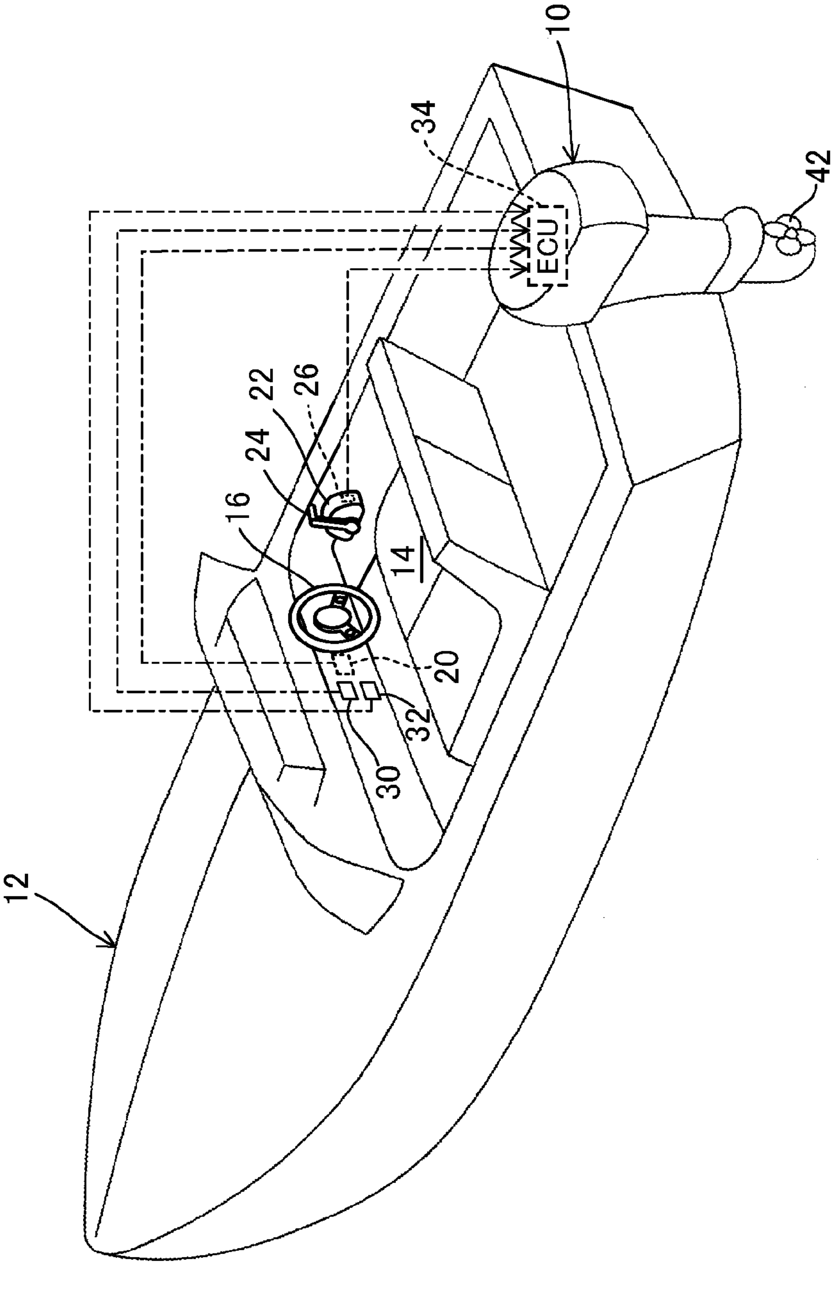
FIG. 1 is an overall schematic view of an outboard motor control apparatus including a boat (hull) according to an embodiment of the invention.
Figure 2:
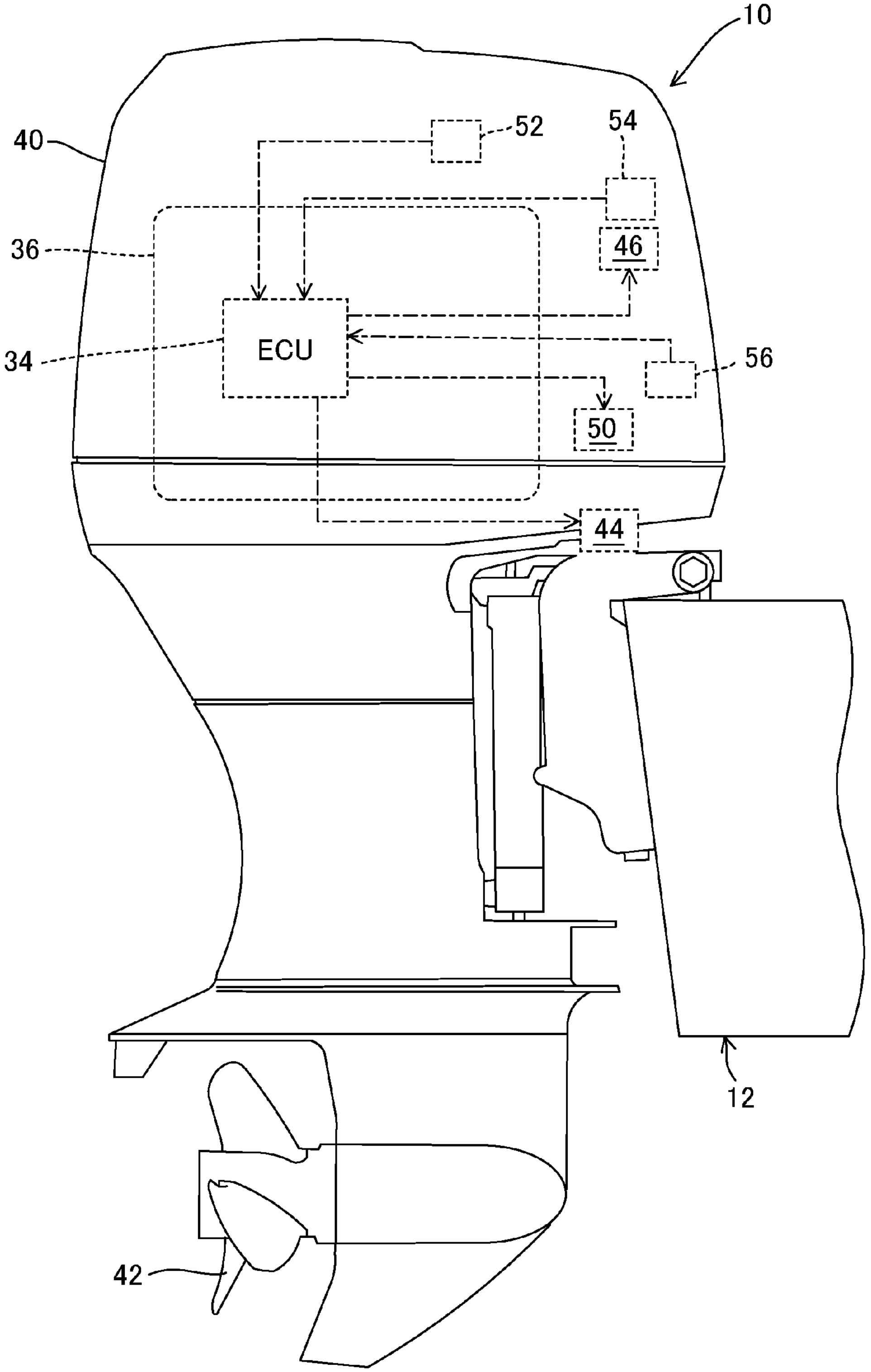
FIG. 2 is an enlarged side view of the outboard motor shown in FIG. 1.

FIG. 1 is an overall schematic view of an outboard motor control apparatus including a boat (hull) according to an embodiment of the invention. FIG. 2 is an enlarged side view of the outboard motor shown in FIG. 1 and FIG. 3 is an enlarged partially sectional side view thereof.

Figure 3:
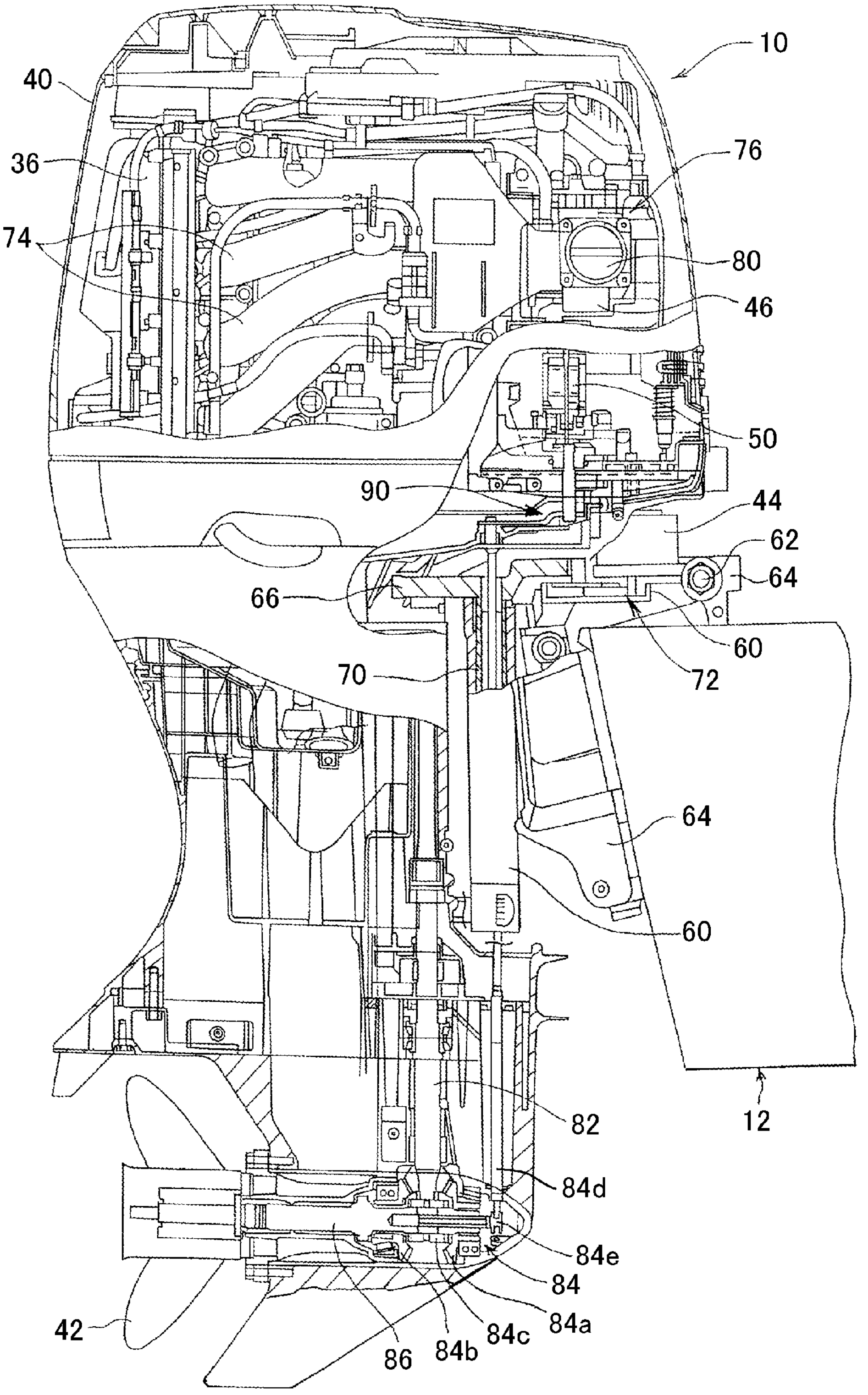
FIG. 3 is an enlarged partially sectional side view of the outboard motor shown in FIG. 1.

In FIGS. 1 to 3, reference numeral 10 indicates an outboard motor. As illustrated, the outboard motor 10 is clamped (fastened) to the stern or transom of a boat (hull) 12.

As shown in FIG. 1, a steering wheel 16 is installed near a cockpit (the operator's seat) 14 of the boat 12 to be manipulated or rotated by the operator (not shown). A steering angle sensor 20 installed near a shaft (not shown) of the steering wheel 16 produces an output or signal corresponding to the steering angle applied or inputted by the operator through the steering wheel 16.

A remote control box 22 provided near the cockpit 14 is equipped with a shift/throttle lever 24 installed to be manipulated by the operator. Upon the manipulation, the lever 24 can be swung in the front-back direction from the initial position and is used by the operator to input a shift position change command and engine speed regulation command. A lever position sensor 26 is installed in the remote control box 22 and produces an output or signal corresponding to a position of the lever 24.

In addition to the lever 24, an up switch (up command signal outputting device) 30 and down switch (down command signal outputting device) 32 are installed near the cockpit 14 to be manipulated by the operator to input engine speed regulation commands. Upon manipulation, the up switch 30 produces an output or signal (ON signal) of up command to increase the engine speed and the down switch 32 produces an output or signal (ON signal) of down command to decrease the engine speed. The engine speed can be regulated through any of the lever 24, up switch 30 and down switch 32, which will be explained later, and the operator chooses (or switches to) the appropriate one.

The outputs of the steering angle sensor 20, lever position sensor 26, and up and down switches 30, 32 are sent to an electronic control unit (ECU) 34 disposed in the outboard motor 10. The ECU 34 has a microcomputer including a CPU, ROM, RAM and other devices.

As shown in FIG. 2, an internal combustion engine (hereinafter referred to as the "engine") 36 is disposed in the upper portion of the outboard motor 10. The engine 36 comprises a spark-ignition, water-cooling gasoline engine with a displacement of 2,200 cc. The engine 36 is located above the water surface and covered by an engine cover 40. The aforementioned ECU 34 is installed near the engine 36 in the engine cover 40.

A propeller 42 is attached at the lower portion of the outboard motor 10. The engine output is transmitted to the propeller 42 to be rotated, and the resulting thrust makes the boat 12 move forward or rearward.

The outboard motor 10 has an electric steering motor (actuator) 44 for steering the outboard motor laterally, an electric throttle motor (actuator) 46 for opening/closing a throttle valve (not shown in FIG. 2) of the engine 36, and an electric shift motor (actuator) 50 for operating a shift mechanism (not shown in FIG. 2) to change the shift position.

A crank angle sensor (engine speed detector) 52 is installed near a crankshaft (not shown) of the engine 36 and produces a pulse signal at every predetermined crank angle. The pulse signal is sent to the ECU 34 and the ECU 34 counts the inputted pulse signals to detect or calculate the engine speed NE.

A throttle opening sensor 54 is installed near the throttle motor 46 and produces an output or signal indicative of opening of the throttle valve, i.e., throttle opening θTH. A shift position sensor 56 installed near the shift motor 50 produces an output or signal corresponding to a shift position (neutral, forward or reverse) of the outboard motor 10. The outputs of the throttle opening sensor 54 and shift position sensor 56 are also sent to the ECU 34.

The structure of the outboard motor will be explained in detail with reference to FIG. 3. The outboard motor 10 is fastened to the stern of the boat 12 through a swivel case 60, tilting shaft 62 and stern brackets 64. The outboard motor 10 is equipped with a mount frame 66 and shaft 70. The shaft 70 is housed in the swivel case 60 to be rotatable about the vertical axis such that the outboard motor 10 can be rotated about the vertical axis relative to the boat 12. The mount frame 66 is fixed at its upper end and lower end to a frame (not shown) constituting a main body of the outboard motor 10.

The aforementioned steering motor 44 is disposed at the top of the swivel case 60. A rotational output of the steering motor 44 is transmitted to the shaft 70 via a speed reduction gear mechanism 72 and the mount frame 66, whereby the outboard motor 10 is steered about the shaft 70 as a steering axis to the right and left directions (steered about the vertical axis).

An intake pipe 74 of the engine 36 is connected to a throttle body 76. The throttle body 76 has the throttle valve (now assigned by 80) installed therein and the throttle motor 46 is integrally disposed thereto. The output shaft of the throttle motor 46 is connected to the throttle valve 80 via a speed reduction gear mechanism (not shown). The operation of the throttle motor 46 is controlled to open and close the throttle valve 80, thereby regulating the flow rate of air sucked in the engine 36 to control the engine speed.

The outboard motor 10 further comprises a drive shaft 82 installed parallel to the vertical axis to be rotatably supported. The upper end of the drive shaft 82 is connected to the crankshaft (not shown) of the engine 36 and the lower end thereof is connected via the shift mechanism (now assigned by 84) with a propeller shaft 86 supported to be rotatable about the horizontal axis. One end of the propeller shaft 86 is attached with the propeller 42.

The shift mechanism 84 comprises a forward bevel gear 84*a* and reverse bevel gear 84*b* which are connected to the drive shaft 82 to be rotated, a clutch 84*c* which can engage the propeller shaft 86 with either one of the forward bevel gear 84*a* and reverse bevel gear 84*b*, and other components.

The interior of the engine cover 40 is disposed with the shift motor 50. The output shaft of the shift motor 50 can be connected via a speed reduction gear mechanism 90 with the upper end of a shift rod 84*d* of the shift mechanism 84. When the shift motor 50 is operated, its output appropriately displaces the shift rod 84*d* and a shift slider 84*e* to move the clutch 84*c* to change the shift position among a forward position, reverse position and neutral position.

When the shift position is forward or reverse, the rotational output of the drive shaft 82 is transmitted via the shift mechanism 84 to the propeller shaft 86 to rotate the propeller 42 in one of the directions making the boat 12 move forward or rearward. The outboard motor 10 is equipped with a power source (not shown) such as a battery or the like attached to the engine 36 to supply operating power to the motors 44, 46, 50, etc.

Figure 4:
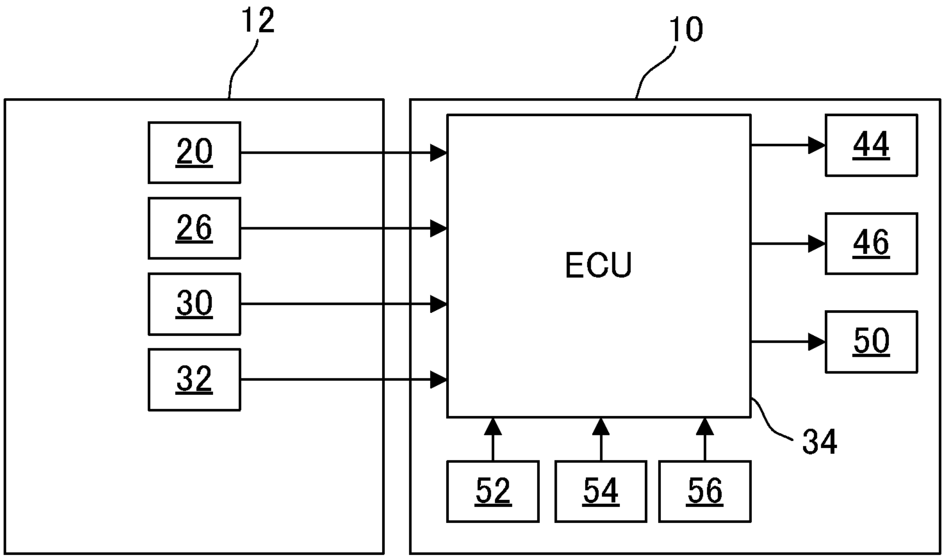
FIG. 4 is a block diagram showing the configuration of the apparatus shown in FIG. 1.

FIG. 4 is a block diagram showing the configuration of the apparatus etc. according to this embodiment.

As shown in FIG. 4, the outputs of the foregoing sensors 20, 26, 52, 54, 56 and up and down switches 30, 32 are sent to the ECU 34. Based on the output of the steering angle sensor 20 from among the inputted outputs, the ECU 34 controls the operation of the steering motor 44 to steer the outboard motor 10 laterally.

Based on the outputs of the lever position sensor 26 and shift position sensor 56, the ECU 34 controls the operation of the shift motor 50 to change the shift position. Based on the outputs of the lever position sensor 26, crank angle sensor 52 and throttle opening sensor 54, the ECU 34 controls the operation of the throttle motor 46 to increase/decrease the engine speed.

Further, based on the output of the up switch 30 (i.e., an up command signal generated by the up switch 30 upon manipulation by the operator), the output of the down switch 32 (i.e., a down command signal generated by the down switch 32 upon manipulation by the operator), the engine speed NE detected by the crank angle sensor 52 and the throttle opening θTH detected by the throttle opening sensor 54, the ECU 34 controls the operation of the throttle motor 46.

Thus, the apparatus according to this embodiment is a DBW (Drive-By-Wire) control apparatus whose operation system (shift/throttle lever 24 and up and down switches 30, 32) has no mechanical connection with the outboard motor 10.

Figure 5:
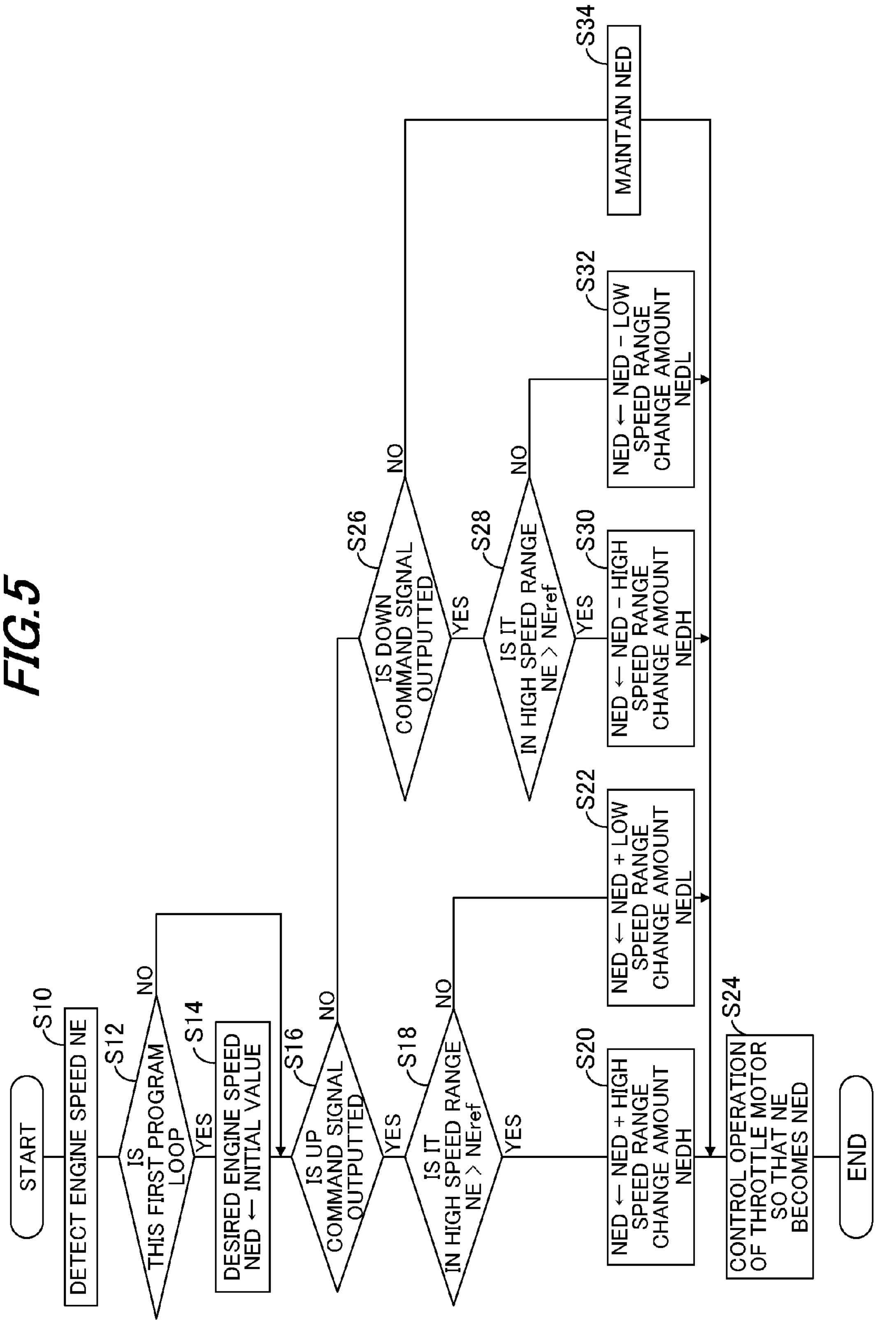
FIG. 5 is a flowchart showing the operation of an ECU shown in FIG. 1.

FIG. 5 is a flowchart showing the operation of the ECU 34, i.e., a process for controlling the operation of the throttle motor 46 through manipulation of the up and down switches 30, 32. The illustrated program is executed by the ECU 34 at predetermined interval, e.g., 100 milliseconds.

The program begins at S10, in which the engine speed NE is detected or calculated from the output of the crank angle sensor 52, and proceeds to S12, in which it is determined whether this program loop is conducted for the first time since the engine 36 was started.

When the result in S12 is affirmative, the program proceeds to S14, in which a desired engine speed NED of the engine 36 is set with an initial value (for example, idling speed NE1, i.e., 1300 rpm). The result in S12 in the next and ensuing loops becomes negative and the step of S14 is skipped.

The program then proceeds to S16, in which it is determined whether the up command signal for increasing the engine speed NE is outputted from the up switch 30, i.e., whether the up switch 30 is manipulated (pressed) by the operator to output the ON signal.

When the result in S16 is affirmative, the program proceeds to S18, in which it is determined whether the detected engine speed NE exceeds a reference speed NEref. This determination is made to check as to whether the engine 36 is within a range of relatively high engine speed (high speed range). The reference speed NEref (e.g., 2000 rpm) is set as a criterion for determining whether the engine 36 is in the high speed range.

When the result in S18 is affirmative, the program proceeds to S20, in which a sum obtained by adding a high speed range change amount NEDH to the present desired engine speed NED is set as the new desired engine speed NED. When the result is negative, i.e., when the detected engine speed NE is equal to or less than the reference speed NEref and the engine 36 is determined to be within a range of a relatively low engine speed (low speed range), the program proceeds to S22, in which a sum obtained by adding a low speed range change amount NEDL to the present desired engine speed NED is set as the new desired engine speed NED.

The high and low speed range change amounts NEDH and NEDL represent change amounts of engine speed NE per unit time. The amounts NEDH and NEDL are set with different values in advance so that the low speed range change amount NEDL is smaller than the high speed range change amount NEDH.

Specifically, when the engine 36 is in the high speed range, i.e., when the boat 12 is traveled at high speed, fine control of the engine speed is not necessary and it suffices if the engine speed changes by an appropriate amount in response to manipulation of the up switch 30. In contrast, when the engine 36 is in the low speed range, i.e., when the boat 12 is traveled at low speed such as trolling speed, since fine regulation of the engine speed is required, it is preferred to be capable of fine and precise control of the engine speed.

Therefore, as described in the foregoing, the engine speed control apparatus according to this embodiment is configured such that the engine speed change amount per unit time is made different between the case where the engine speed NE is at or below the reference speed NEref and the case where it is above the reference speed NEref. More specifically, when the engine speed NE is at or below the reference speed NEref, the engine speed change amount (low speed range change amount NEDL) is set smaller than that (high speed range change amount NEDH) when the engine speed NE is above the reference speed NEref, thereby enabling to finely control or regulate the engine speed at the low speed range.

The explanation on FIG. 5 will be resumed. The program then proceeds to S24, in which the operation of the throttle motor 46 is controlled so that the engine speed NE becomes the desired engine speed NED (i.e., the engine speed NE and desired engine speed NED become identical).

Specifically, since the desired engine speed NED is increased in S20 or S22, the engine speed NE is naturally found to be less than the desired engine speed NED in this step. Therefore, the operation of the throttle motor 46 is controlled to increase the throttle opening θTH (i.e., to open the throttle valve 80) so as to increase or raise the engine speed NE to the desired engine speed NED.

On the other hand, when the result in S16 is negative, the program proceeds to S26, in which it is determined whether the down command signal for decreasing the engine speed NE is outputted from the down switch 32, i.e., whether the down switch 32 is manipulated (pressed) by the operator to output the ON signal.

When the result in S26 is affirmative, the program proceeds to S28, in which, similarly to S18, it is determined whether the engine speed NE exceeds the reference speed NEref, i.e., whether the engine 36 is in the high speed range.

When the result in S28 is affirmative, the program proceeds to S30, in which a difference obtained by subtracting the high speed range change amount NEDH from the present desired engine speed NED is set as the new desired engine speed NED. When the result is negative, i.e., when the engine speed NE is equal to or less than the reference speed NEref, the program proceeds to S32, in which a difference obtained by subtracting the low speed range change amount NEDL from the present desired engine speed NED is set as the new desired engine speed NED.

In S30 and S32, the change amounts to be subtracted from the present desired engine speed NED are made different between the high speed range change amount NEDH and low speed range change amount NEDL depending on the engine speed NE for the same reason as in S20 and S22.

The program then proceeds to S24, in which the operation of the throttle motor 46 is controlled so that the engine speed NE becomes the desired engine speed NED. Since the desired engine speed NED is decreased in S30 or S32, the engine speed NE is naturally found to be greater than the desired engine speed NED in this step. Therefore, the operation of the throttle motor 46 is controlled to decrease the throttle opening θTH (i.e., to close the throttle valve 80) so as to decrease or drop the engine speed NE to the desired engine speed NED.

Thus, when one of the up command signal and down command signal is determined to be outputted in S16 or S26, the desired engine speed NED is increased/decreased in S20, S22, S30, S32 to change the speed of the engine 36.

When the result in S26 is negative, i.e., none of the up switch 30 and down switch 32 is manipulated by the operator and the up and down command signals are not outputted, the program proceeds to S34, in which the present desired engine speed NED is held at the current value. As a result, in the following processing of S24, the present engine speed NE is maintained. Thus, when the up and down command signals are not outputted, the speed of the engine 36 is maintained.

Figure 6:
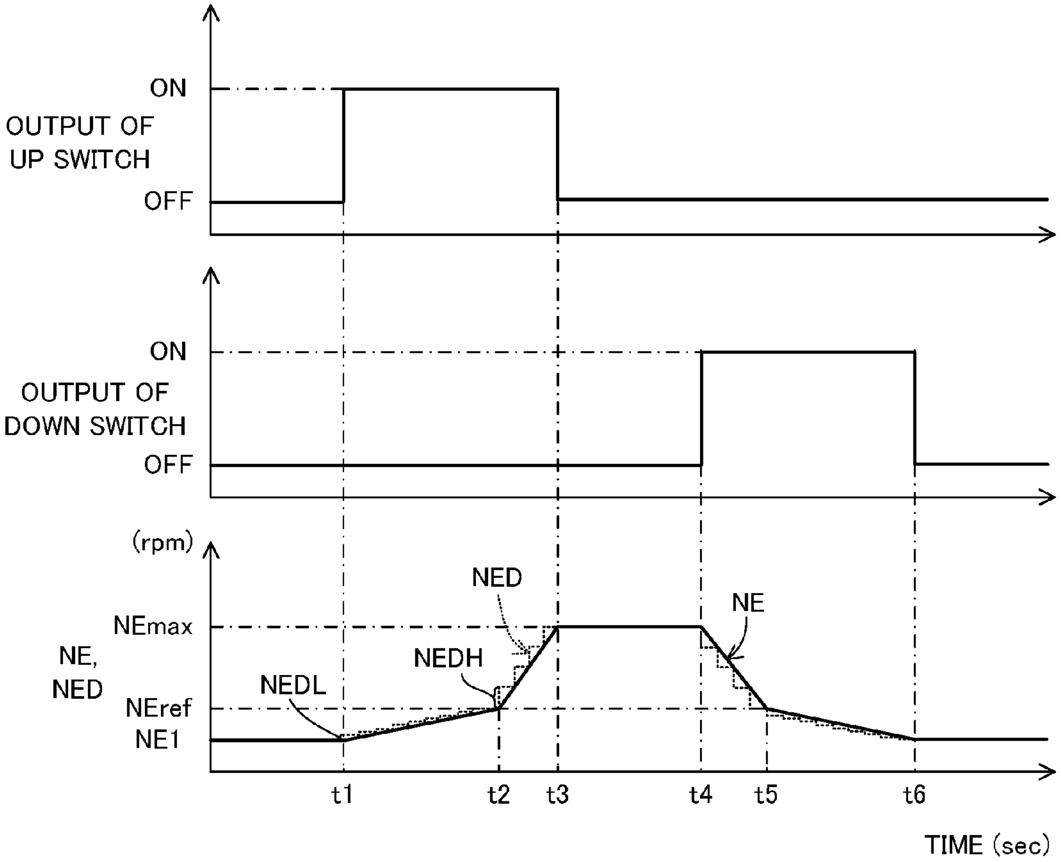
FIG. 6 is a time chart for explaining the processing of the FIG. 5 flowchart.

FIG. 6 is a time chart for explaining the foregoing processing, specifically, showing the changes in the desired engine speed NED and engine speed NE relative to the outputs of the up and down switches 30, 32. In the drawing, a solid line indicates the engine speed NE and a dotted line the desired engine speed NED.

As shown in FIG. 6, from the time t1 to t3, when the up command signal (ON signal) is outputted upon manipulation of the up switch 30 by the operator (the affirmative result in S16 in the FIG. 5 flowchart), the desired engine speed NED is increased in increments of the low speed range change amount NEDL (or high speed range change amount NEDH) to increase the engine speed NE.

To be more specific, as seen in from the time t1 to t2, when the engine speed NE is at or below the reference speed NEref (the negative result in S18), i.e., when the engine operation is in the low speed range, the desired engine speed NED is increased in increments of the low speed range change amount NEDL every unit time (S22) to gradually increase the engine speed NE (S24).

When, at the time t2, the engine speed NE exceeds the reference speed NEref (the affirmative result in S18), i.e., when the engine operation enters the high speed range, as seen in from the time t2 to t3, the desired engine speed NED is increased in increments of the high speed range change amount NEDH every unit time (S20) to increase the engine speed NE (S24). Since the high speed range change amount NEDH is set greater than the low speed range change amount NEDL, the change amount of the engine speed NE in the high speed range becomes greater than that in the low speed range.

When, at the time t3, the manipulation of the up switch 30 is stopped and none of the up command signal and down command signal is outputted (the negative results in S16 and S26), the desired engine speed NED is held at a value at the time t3 (here, at a maximum speed NEmax of the engine 36 (e.g., 5000 rpm)) (S34) to maintain the engine speed NE at the maximum speed NEmax (S24).

When, from the time t4 to t6, the down command signal (ON signal) is outputted upon manipulation of the down switch 32 by the operator (the affirmative result in S26), the desired engine speed NED is decreased in decrements of the low speed range change amount NEDL (or high speed range change amount NEDH) to decrease the engine speed NE.

To be more specific, as seen in from the time t4 to t5, when the engine speed NE is above the reference speed NEref (the affirmative result in S28), i.e., when the engine operation is in the high speed range, the desired engine speed NED is decreased in decrements of the high speed range change amount NEDH every unit time (S30) to decrease the engine speed NE (S24).

When, at the time t5, the engine speed NE becomes at or below the reference speed NEref (S28), i.e., when the engine operation enters the low speed range, as seen in from the time t5 to t6, the desired engine speed NED is decreased in decrements of the low speed range change amount NEDL every unit time (S32) to gradually decrease the engine speed NE (S24).

When, at the time t6, the manipulation of the down switch 32 is stopped and none of the up command signal and down command signal is outputted (the negative results in S16 and S26), the desired engine speed NED is held at a value at the time t6 (here, at the idling speed NE1 of the engine 36) (S34) to maintain the engine speed NE at the idling speed NE1 (S24).

As stated above, the embodiment is configured to have an apparatus for and method of controlling a speed of an internal combustion engine (36) installed in an outboard motor (10) adapted to be mounted on a stern of a boat (12), comprising: an actuator (electric throttle motor 46) connected to a throttle valve (80) of the engine to open and close the throttle valve; an engine speed controller (ECU 34) that controls the engine speed NE by controlling operation of the actuator; an up command signal outputting device (up switch 30) that outputs an up command signal to increase the engine speed NE when manipulated by an operator; a down command signal outputting device (down switch 32) that outputs a down command signal to decrease the engine speed NE when manipulated by the operator; and an engine speed detector (crank angle sensor 52; ECU 34; S10) that detects the engine speed NE, wherein the engine speed controller controls the engine speed NE to change in response to the up command signal and the down command signal with a change amount of the engine speed per unit time (NEDH, NEDL) that is made different when the detected engine speed NE is at or below a reference speed NEref and when the detected engine speed is above the reference speed (S16-S32).

Thus, since it is configured to change the engine speed NE in response to the up command signal and down command signal, the operator can easily regulate the engine speed NE only by manipulating the up switch 30 and down switch 32, i.e., with the simple switch manipulation.

Further, since it is configured such that the engine speed change amount (high and low speed range change amounts NEDH, NEDL) per unit time is made different between the case when the engine speed NE is at or below the reference speed NEref and the case when it is above the reference speed NEref, it becomes possible to set the change amount (low speed range change amount NEDL) when the engine 36 is in the low speed range smaller than that (high speed range change amount NEDH) when it is in the high speed range. With this, it becomes possible to finely and precisely control the engine speed NE at the low speed range and easily regulate the engine speed NE even when the operator is not accustomed to maneuvering a boat.

In the apparatus and method, the engine speed controller changes the engine speed NE when one of the up command signal and the down command signal is outputted (S16-S32), while maintaining the engine speed NE when none of the up command signal and the down command signal is outputted (S24-S34). With this, since the engine speed NE is changed only when the up switch 30 or down switch 32 is manipulated by the operator, but is maintained as it is when no manipulation is implemented, it becomes possible to regulate the engine speed NE further easily.

In the apparatus and method, the change amount when the engine speed NE is at or below the reference speed NEref is set to be smaller than that when the engine speed NE is above the reference speed NEref. With this, since the change amount (NEDL) when the engine 36 is in the low speed range is smaller than that (NEDH) when it is in the high speed range, it becomes possible to achieve fine and precise control of the engine speed in the low speed range.

In the apparatus and method, the engine speed controller changes the engine speed NE with the different change amount by controlling the engine speed to a desired engine speed NED. With this, it becomes possible to surely achieve fine and precise control of the engine speed in the low speed range.

In the apparatus and method, the up command signal outputting device comprises a switch (30) installed on the boat to be manipulated by the operator. With this, it becomes possible to easily regulate the engine speed with simple switch manipulation.

In the apparatus and method, the down command signal outputting device comprises a switch (32) installed on the boat to be manipulated by the operator. With this, it becomes possible to easily regulate the engine speed with simple switch manipulation.

In the apparatus and method, the reference speed NEref is set as a criterion for determining whether operation of the engine 36 is in a range of relatively high engine speed.

It should be noted that, although, in the foregoing, two kinds of engine speed change amount, i.e., high and low speed range change amounts NEDH, NEDL are prepared, the change amounts may be three kinds or more in accordance with the engine speed.

It should also be noted that, although the same low speed range change amount NEDL is used regardless of whether the up command signal or down command signal is outputted, different change amounts can be used. The same applies to the high speed range change amount NEDH.

It should also be noted that, although the reference speed NEref, initial value of the desired engine speed NED, displacement of the engine 36 and other values are indicated with specific values in the foregoing, they are only examples and not limited thereto.

It should further be noted that, although the up and down switches 30, 32 are installed on the boat 12 side, they may be installed on, for instance, the outboard motor 10 side.

Japanese Patent Application No. 2009-186430 filed on Aug. 11, 2009 is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for controlling a speed of an internal combustion engine installed in an outboard motor adapted to be mounted on a stern of a boat, comprising:

- an actuator connected to a throttle valve of the engine to open and close the throttle valve;
- an engine speed controller that controls the engine speed by controlling operation of the actuator;
- an up command signal outputting device that outputs an up command signal to increase the engine speed when manipulated by an operator;
- a down command signal outputting device that outputs a down command signal to decrease the engine speed when manipulated by the operator; and
- an engine speed detector that detects the engine speed,
- wherein the engine speed controller controls the engine speed to change in response to the up command signal and the down command signal with a change amount of the engine speed per unit time that is made different when the detected engine speed is at or below a reference speed and when the detected engine speed is above the reference speed.

2. The apparatus according to claim 1, wherein the engine speed controller changes the engine speed when one of the up command signal and the down command signal is outputted, while maintaining the engine speed when none of the up command signal and the down command signal is outputted.

3. The apparatus according to claim 1, wherein the change amount when the engine speed is at or below the reference speed is set to be smaller than that when the engine speed is above the reference speed.

4. The apparatus according to claim 1, wherein the engine speed controller changes the engine speed with the different change amount by controlling the engine speed to a desired engine speed.

5. The apparatus according to claim 1, wherein the up command signal outputting device comprises a switch installed on the boat to be manipulated by the operator.

6. The apparatus according to claim 1, wherein the down command signal outputting device comprises a switch installed on the boat to be manipulated by the operator.

7. The apparatus according to claim 1, wherein the reference speed is set as a criterion for determining whether operation of the engine is in a range of relatively high engine speed.

8. A method of controlling a speed of an internal combustion engine installed in an outboard motor adapted to be mounted on a stern of a boat, having an actuator connected to a throttle valve of the engine to open and close the throttle valve, and an engine speed controller that controls the engine speed by controlling operation of the actuator; comprising the steps of:

- outputting an up command signal to increase the engine speed when manipulated by an operator;
- outputting a down command signal to decrease the engine speed when manipulated by the operator; and
- detecting the engine speed, and
- controlling the engine speed to change in response to the up command signal and the down command signal with a change amount of the engine speed per unit time that is made different when the detected engine speed is at or below a reference speed and when the detected engine speed is above the reference speed.

9. The method according to claim 8, wherein the step of engine speed controlling changes the engine speed when one of the up command signal and the down command signal is outputted, while maintaining the engine speed when none of the up command signal and the down command signal is outputted.

10. The method according to claim 8, wherein the change amount when the engine speed is at or below the reference speed is set to be smaller than that when the engine speed is above the reference speed.

11. The method according to claim 8, wherein the step of engine speed controlling changes the engine speed with the different change amount by controlling the engine speed to a desired engine speed.

12. The method according to claim 8, wherein the step of up command signal outputting is made by a switch installed on the boat to be manipulated by the operator.

13. The method according to claim 8, wherein the step of down command signal outputting is made by a switch installed on the boat to be manipulated by the operator.

14. The method according to claim 8, wherein the reference speed is set as a criterion for determining whether operation of the engine is in a range of relatively high engine speed.

* * * * *